United States Patent [19]

Barber et al.

[11] 3,884,037
[45] May 20, 1975

[54] INTERNAL COMBUSTION ENGINE SYSTEM FOR EXHAUST EMISSIONS CONTROL UTILIZING AN ACOUSTIC CATALYTIC MUFFLER

[75] Inventors: Everett M. Barber; John T. Brandenburg, both of Wappingers Falls; Richard A. Frost, Holmes, all of N.Y.

[73] Assignee: Texaco Inc., New York, N.Y.

[22] Filed: May 13, 1971

[21] Appl. No.: 143,236

Related U.S. Application Data

[60] Continuation of Ser. No. 817,599, Feb. 17, 1969, abandoned, which is a division of Ser. No. 368,951, May 20, 1964, Pat. No. 3,495,950.

[52] U.S. Cl.................. 60/292; 23/288 FB; 181/42; 181/71
[51] Int. Cl............................................. F01n 3/14
[58] Field of Search ............ 23/288 F, 2 E; 60/274, 60/292, 300, 305

[56] References Cited
UNITED STATES PATENTS

| | | | |
|---|---|---|---|
| 3,234,924 | 2/1966 | May................................ | 60/292 X |
| 3,247,665 | 4/1966 | Behrens............................. | 60/292 |
| 3,247,666 | 4/1966 | Behrens............................. | 60/292 |
| 3,402,550 | 9/1968 | Behrens............................. | 60/292 |
| 3,406,515 | 10/1968 | Behrens............................. | 60/274 |
| 3,495,950 | 2/1970 | Barber et al...................... | 23/288 F |

*Primary Examiner*—Joseph Scovronek
*Attorney, Agent, or Firm*—T. H. Whaley; C. G. Ries; Joseph Daleda

[57] ABSTRACT

The combination of an internal combustion engine having means for providing additional air adjacent the exhaust valves thereof, valve means for back pressure control in the exhaust system, and an acoustic catalytic muffler having compounds capable of reducing lead products of combustion in exhaust gases prior to their contact with a combination of oxidation catalysts.

9 Claims, 4 Drawing Figures

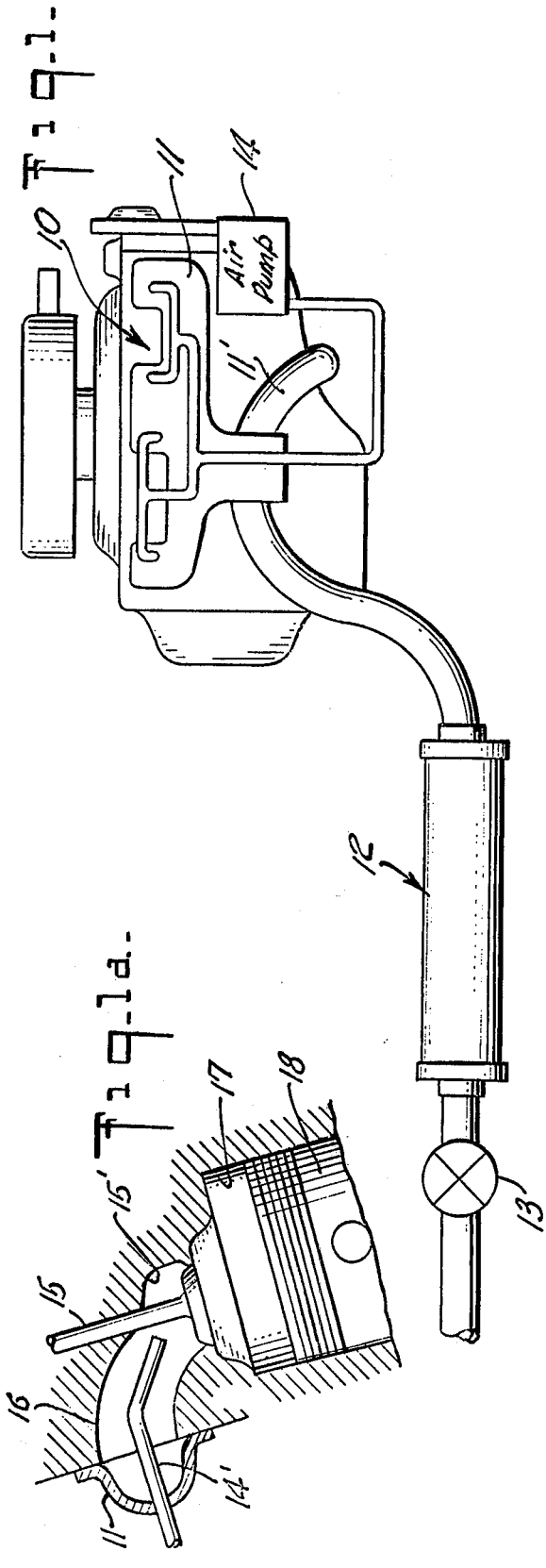
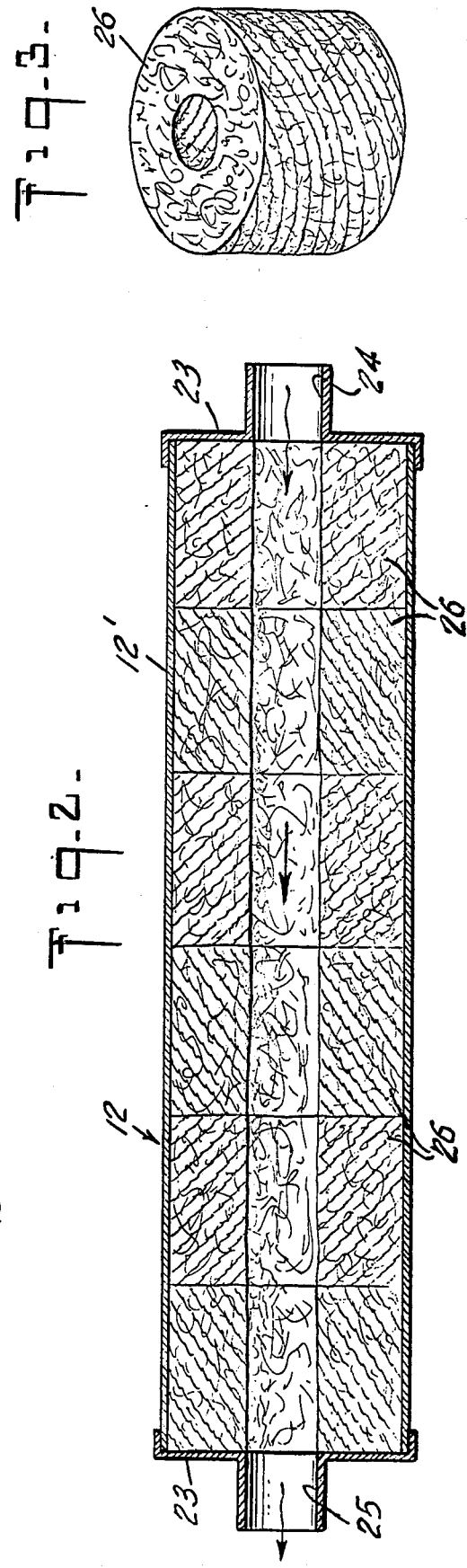

3,884,037

INTERNAL COMBUSTION ENGINE SYSTEM FOR EXHAUST EMISSIONS CONTROL UTILIZING AN ACOUSTIC CATALYTIC MUFFLER

This application is a streamline continuation of Ser. No. 817,599, filed Feb. 17, 1969, now abandoned, which in turn is a division of Ser. No. 368,951, filed May 20, 1964, now U.S. Pat. No. 3,495,950, issued Feb. 17, 1970.

This invention relates generally to the operation of internal combustion engines, and in one specific embodiment, to an apparatus for the control of exhaust emissions therefrom by eliminating combustible and lead compounds from the products of combustion of an internal combustion engine.

Internal combustion engines generally operate at fuel-air mixtures which are richer than stoichiometric, with the result that in the exhaust products of combustion, there are considerable residual combustible compounds including carbon monoxide, hydrogen and hydrocarbons. For automotive exhaust emissions control, it is known that additional air should be added to such exhaust products to produce an overall fuel-air ratio in the exhaust system at least stoichiometric and preferably slightly leaner, and means must be provided for promoting the reaction of the combustible compounds in the exhaust with air to the eventual end products of water and carbon dioxide.

The introduction of air as an oxidizing fluid into the exhaust manifolds of internal combustion engines to convert the carbon monoxide in the engine exhaust products to carbon dioxide is known in the art. Such an oxidizing fluid is introduced adjacent the downstream face of the exhaust valve, where the temperature is sufficiently high so that further combustion can occur spontaneously. Means are also known for mixing and reacting additional air with the combustible compounds in the exhaust products in the form of catalytic reactors.

In order to increase the octane rating of motor fuels, an organic lead compound, such as tetraethyllead, is added. Some lead compounds contained in the exhaust products from an engine operated on such fuels adversely affect many oxidation catalysts which might be employed in exhaust systems, thereby decreasing the activity of the catalysts in a relatively short period of time.

Accordingly, it is an object of our invention to provide an improved means for greatly reducing, if not eliminating for all practical purposes, combustible compounds in the exhaust products of combustion from an internal combustion engine.

It is another object of our invention to provide a catalytic muffler construction which is capable of operating effectively for long periods of time on exhaust gases containing lead compounds resulting from combustion of fuels containing lead anti-knock compounds.

Still another object of this invention is to provide an improved apparatus for the substantially complete oxidation of the combustible compounds in the exhaust gases, in combination with the removal of lead compounds therefrom.

Still another object of our invention is to provide a simple but effective muffler for an automatic exhaust emissions control system in an internal combustion engine for the exhaust products of combustion thereof.

These and other objects, features and advantages of the invention will become apparent from the following description and claims, when read in conjunction with the accompanying drawings wherein:

FIG. 1 is a diagrammatic showing of an internal combustion engine employing our invention;

FIG. 1a is a way of providing additional air adjacent and downstream an exhaust port;

FIG. 2 is a longitudinal cross section of our improved catalytic muffler construction; and FIG. 3 is an isometric view of an individual section of the catalyst supporting material used in the muffler construction.

The objects of our invention are achieved by introducing additional air into the exhaust gases of an internal combustion engine for further reaction with the products of combustion exhausted therefrom and promoting the reaction of air and the residual combustibles therein and removing other undesirables by using a novel catalytic muffler construction.

An engine driven pump has been found feasible for providing additional air to the engine exhaust system. The mixture of additional air and exhaust products of combustion undergoes some combustion prior to delivery to a chamber where more mixing and combustion occur. In some non-catalytic combustion types, such a chamber is known as a direct flame afterburner where ignition is initiated by positive means, such as a glow plug or a spark plug.

Catalytic reaction chambers or reactors are characterized by the features that (a) a catalyst is impregnated on a ceramic or refractory base in the form of bricks, spheres, pellets or porous material, and (b) the exhaust gases plus additional air to complete the combustion thereof are introduced into the reaction chamber packed with the catalyst for mixing and reacting as they pass over and through the catalyst bed.

The principal advantages of the catalytic reactor over the direct flame afterburner are the lower reaction temperatures and the elimination of the extra fuel consumption. Some disadvantages are that the typical catalytic reactor is large and with a large thermal mass, a relatively long time of start-up operation is needed to warm up the catalyst to its activation temperature; and while some catalysts may resist lead poisoning, they tend to break up and become ineffective because of combined thermal and mechanical shock from "stop and go" driving and fluctuating load characteristics of automotive service, and from pulsating gas flow and mechanically induced vibrations. Also, deposits from the products of combustion may coat the catalyst and so impair its action.

Referring to FIG. 1 of the drawings, there is disclosed the general showing of an apparatus or engine system wherein the invention is used, consisting basically of an internal combustion engine at 10, with an exhaust system including an exhaust manifold at 11, leading to a catalytic muffler indicated at 12. There is disclosed at 13, a diagrammatic showing of a valve for regulating exhaust back pressure, shown located downstream of the catalytic muffler. At 14, there is disclosed an engine driven air pump for providing additional air to the exhaust system of the engine, in the manner shown specifically in FIG. 1a, through inlet tubing 14'. Other means for introducing additional air into the exhaust system adjacent an exhaust port are available.

As known in the art, additional air is provided adjacent the downstream face of the exhaust valve 15, FIG. 1a, which closes the exhaust port at 15' in the cylinder head 16 of an internal combustion engine, having a cylinder located at 17 and a piston therein at 18. It is evident that with the inlet tubing 14' passing through the exhaust manifold indicated at 11, there is some preheating of the additional air. Preheating of the additional air may be accomplished in other ways, e.g. by cooling of engine locations subject to overheating, and could be used when engine characteristics suggest that the additional air be introduced at higher than ambient temperature. The exhaust pipe at 11', FIG. 1, leads from the exhaust manifold of the other bank of engine cylinders, as in the case of V-type engines, and brings along the exhaust gases and additional air in various stages of reaction.

In the area of air introduction, the temperatures of the exhaust gases vary from 1400°F. to 2400°F., depending upon engine operating conditions, so that in the presence of additional air, the combustible compounds in the products of combustion can ignite spontaneously. At low and medium load conditions, it has been found that to promote a more complete combustion of the residual combustibles, additional back pressure should be imposed on the gases in the exhaust system in addition to that imposed by the conventional muffler and/or catalytic reactor construction. Normally, the exhaust back pressure imposed by the conventional muffler structure at engine idling conditions may amount to approximately 0.5 psi., and under conditions of wide open throttle operation (at approximately 70 mph and higher) may amount generally to as much as 10 psi., due largely to the large mass volume of gases, as well as to their inertia, passing through the muffler.

In the coassigned application for patent for an Internal Combustion Engine System for Exhaust Emissions Control, Ser. No. 335,122, filed Jan. 2, 1964, by Milton D. Behrens, which issued as U.S. Pat. No. 3,406,515 on Oct. 22, 1968, and was copending with the patent application Ser. No. 368,951, the disclosure of which is incorporated herein by this reference, the introduction of additional air and the raising of the exhaust back pressure to further the reaction with the exhaust products of combustion is set forth. Therein is disclosed that to achieve the improved afterburning conditions, as a generalization, the excess back pressure should be greater than that imposed by the ordinary muffler construction, and should be greater than 1.05 times the atmospheric pressure to attain at least minimum control standards of reduction of hydrocarbon content.

Certain present statutory requirements for reducing pollutants contributing to air pollution include that the hydrocarbon concentration of the average automotive exhaust gases be reduced to an average of 275 ppm, and carbon monoxide concentration to an average of 1.5%. To meet such present statutory requirements, it is known that the exhaust back pressure ratio should be about one-eighth greater than the atmospheric pressure.

Further, there is disclosed in the above cited copending application for patent that with the use of elevated exhaust back pressure in promoting the exhaust system afterburning reaction, with the addition of air, the ratio of the actual fuel-air mixture to the stoichiometric fuel-air mixture being indicated as $\gamma$, varies from about 0.95 to at least 1.50. The addition of air is continuous and is provided the exhaust system at a pressure sufficient for free flow thereto. Too great an amount of additional air leads to lowering of the temperature in the exhaust system so that the extent of additional burning is decreased and the cost of pumping is increased. When necessary, the additional air can be preheated, too.

While the concentration of the combustible compounds in the exhaust products of combustion can be reduced satisfactorily to meet the minimum conditions set by certain present ordinances, it is possible to reduce further the unburned hydrocarbon concentration by the use of a catalytic reactor positioned in or adjacent the muffler for a further afterburning reaction. Such a catalytic reactor could provide not only for the reduction of the hydrocarbon concentration but also control the amounts of other gases, such as the oxides of nitrogen, which are included in the noxious materials leaving the exhaust system afterburning reaction. The introduction of additional air into the exhaust system adjacent an exhaust port causes combustion of hydrocarbons and carbon monoxide and raises the temperature in this area higher than normal. This higher temperature then causes even more complete or greater combustion of hydrocarbons and carbon monoxide in the area of the exhaust port and manifold. Thus, hydrocarbons and carbon monoxide which undergo combustion in the exhaust manifold area obviously reduce the load on the catalytic reactor. To achieve such results, FIG. 1 discloses diagrammatically a basic structure by which the exhaust back pressure is maintained at the required level to promote the exhaust system afterburning, with the valve at 13 to control the back pressure on the exhaust gases flowing through the catalytic muffler at 12.

The catalytic muffler is connected to the exhaust manifold 11 by an exhaust pipe of sufficient volume and optimum length; short enough that following cold starts and during idle and deceleration, the exhaust gases will be hot enough to insure rapid warm up of the catalyst, thereby resulting in effective oxidation of the hydrocarbons and CO in the catalytic muffler and yet far enough away so that during cruise and high speeds the exhaust gases will have time for combustion and cooling prior to their entry into the catalytic muffler thereby decreasing the heat load on the catalyst.

Referring now to FIGS. 2 and 3, the catalytic muffler construction, shown generally at 12, comprises a casing 12', either cylindrical or elliptical, having end members 23, with an inlet at 24 and an outlet at 25. Within this casing, there is a catalytic structure shown as comprising a plurality of sections 26 of catalyst supporting material, the catalyst being capable of reacting with pollutants in the engine exhaust emissions. Alternatively, a single section could be used as the catalytic structure.

The catalyst supporting material 26 is formed from a substrate comprising an aggregate of stainless steel wool, preferably. As desired, metal knitted mesh or screen or various combinations of metal fibers in the form of filaments, wires, or the like, may be disposed randomly in woven, interlaced, reticulate or wrapped forms. Woven metal fabric, e.g. stainless steel screen, may be employed to hold stainless steel wool or knit mesh in a desired shaped form, e.g., in cylindrical form, and may be spirally or concentrically disposed therein.

In a preferred embodiment, the substrate of the catalyst structure is made up of coarse grade stainless steel wool, e.g., steel wool having a fiber thickness of 4 to 7 mils and width of 8 to 12 mils.

The substrate, formed of a metal or non-metal of sufficient strength and mechanical stability for use in a catalytic reactor, may include steel, stainless steel, aluminum, copper, nickel and titanium, including sintered metal materials, and refractory or ceramic materials including high melting glass, refractory metal oxides, e.g., magnesia and silica, and refractory metal silicates and carbides. A metal substrate is particularly advantageous in that metals are characterized by relatively high thermal conductivity. During the catalytic oxidation of exhaust gases, heat transfer from the catalyst structure is accomplished readily by means of the extended metal substrate. During the initial starting period when the operating temperature is low, heat is conducted throughout the catalyst structure thereby bringing the structure up to operating temperatures. On the other hand, when the temperature is high, heat transfer rates are greater and the metal substrate will conduct the heat to the surroundings thereby facilitating dissipation of heat.

As used in the present invention, the wad or mass of fibrous material is twisted to impart a generally helical configuration, as disclosed in FIGS. 2 and 3, even though there may be fibers interspersed within the mass which do not conform to the general helical configuration. The twisted sections are shaped into an annulus having an inner diameter equal to that of the inlet and outlet, thereby providing an exhaust flow passage of uniform internal diameter through the muffler.

Adjoining sections are positioned in the muffler to provide contrasting helix angles, the greatest contrast being when the sections are positioned in opposite angular relationship to each other, e.g. if a section had a clockwise inclination, then the adjacent sections would appear to be inclined counter-clockwise. Thus, the helical configuration of the mass of the catalyst supporting material comprised of sections with contrasting helix angles would provide increased turbulence, and as the exhaust gases pulse in and out of the several sections during their passage through the muffler, there would be excellent sound absorption, as well as catalytic reaction, with little increase in back pressure with increase in gas flow through the muffler.

Suitable catalysts for the treatment of exhaust gases are disclosed in the copending and coassigned applications of John T. Brandenburg and Robert J. Leak, Ser. No. 205,846, filed June 28, 1962, which issued as U.S. Pat. No. 3,227,659 on Jan. 4, 1966, and Ser. No. 251,067, filed Jan. 14, 1963 now abandoned in favor of continued application Ser. No. 695,285, which issued as U.S. Pat. No. 3,410,651 on Nov. 12, 1968, and the copending and coassigned application of Robert J. Leak, Ser. No. 332,899, filed Dec. 12, 1963, which issued as U.S. Pat. No. 3,362,783 on Jan. 9, 1968, the disclosures of which are incorporated herein by this reference. The novel catalytic structures disclosed in these applications involve broadly a substrate of extended dimensions having an adherent layer of alumina deposited thereon and upon which an oxidation catalyst is deposited in turn. In both of the Brandenburg et al. applications, an additional catalyst is applied in position on the layered substrate ahead of the oxidation catalyst to react with the lead compounds in the engine exhaust gases, in order that the latter may become substantially free or depleted of lead compounds prior to contacting a suitable oxidation catalyst, which may be more susceptible to lead poisoning.

The substrate is provided with an adherent film of alumina formed by contacting the substrate with a solution of an alkali metal aluminate, e.g. sodium or potassium aluminate, and by proper processing a film of gamma or eta alumina is obtained, which phases of alumina have a large total surface area per unit weight, resulting in a carrier characterized by a high adsorptive property. Preferably, the substrate is positioned in its casing prior to coating with the alumina film so that the alumina coats not only the metal fibers, but also coats the casing, thereby bonding the metal fibers substrate to the inside wall of the casing, the resilience of the twisted sections providing good contact therewithin. This gives added rigidity to the substrate and prevents blowby of exhaust gases. The alumina coated substrate can be impregnated then with one or more catalysts.

The method utilized in depositing the catalyst material upon the alumina film is dependent to some extent upon the particular catalyst material employed. In one method, the catalyst material is deposited by chemically reducing a solution containing a soluble compound of the catalyst material in the presence of the substrate bearing the alumina film under such conditions as to effect a substantially uniform deposition of the catalyst material upon the alumina surface.

Metals useful in the preparation of the catalyst are those from the group consisting of Group VIII and of Period 4 of the Periodic Table of Elements. The metals from Group VIII include nickel, platinum, iron and cobalt, and combinations thereof, and those metals from Period 4 include copper, vanadium, chromium, manganese, and combinations thereof. The deposited material is generally heated or calcined at a suitable temperature for purposes of conditioning the catalyst. As disclosed in the above cited Leak application for patent, vanadium pentoxide and complexes of copper oxide and copper chromite are useful as catalysts, particularly in combination wherein the exhaust gases first contact the vanadium pentoxide catalyst and then contact the copper oxide-copper chromite catalyst.

In an alternative method, the added oxidation catalyst material may be impregnated on the alumina film by contacting the oxide coated substrate with a solution containing the catalyst material, generally, by immersing the alumina coated substrate in a solution of a salt of the catalyst material.

In still another method, the oxidation catalyst material may be deposited on the alumina film by pasting a slurry of the material, e.g. the oxides of copper, chromium or zinc may be pasted on the alumina coated substrate, and then calcined at a suitable temperature for purposes of conditioning the catalyst.

It should be understood that two or more metal-containing catalyst materials may be deposited on the alumina film, e.g., copper and chromium may be co-deposited from a solution of their nitrate salts. The co-deposits may be then calcined or otherwise activated. In this manner, a co-deposit of copper and chromium results in a catalyst material comprising a copper oxide-copper chromite complex.

In the first of the above cited joint coassigned applications for patent, there is disclosed how a phosphorus-containing material may be impregnated on the alumina film by contacting the alumina with a solution containing a compound of phosphorus, usually, by immersing the alumina coated substrate in a solution of salt of the phosphorus-containing material.

The phosphorus compounds found particularly useful include the alkali metal phosphates and the alkaline earth metal phosphates, and more preferably the acid phosphates of these metals which react readily with the lead compounds present in exhaust gases such as sodium dihydrogen phosphate, disodium hydrogen phosphate, sodium phosphate and mixtures thereof, and their alkaline earth counterparts.

The alumina coated substrate having a phosphate deposit thereon is dried in air at a temperature approximating that of an exhaust system of an internal combustion engine for the purpose of conditioning the structure, and the several steps of the process of applying the catalyst are repeated as often as considered necessary, dependent upon the requirements of the engine and the type fuel employed in operating it. Thereafter, as has been disclosed above, an oxidation catalyst material is deposited or impregnated upon the alumina coated substrate, in particular, vanadium pentoxide being preferred.

In the second of the above cited joint coassigned applications, there is disclosed that a chromium-containing compound or material may be impregnated on the alumina film by contacting the alumina with a solution containing a compound of chromium, viz. by immersing the alumina coated substrate in a solution of a salt of the chromium-containing compound.

Chromium-containing compounds found useful in the preparation of catalysts include the alkali metal chromates and dichromates and the alkaline earth metal chromates and dichromates, e.g. potassium chromate, potassium dichromate, sodium chromate, sodium dichromate, and their alkaline earth counterparts, e.g., calcium chromate, with potassium chromate being preferred. Also useful are other metal chromates and dichromates such as lead chromate, as well as chromic acid and other trivalent chromium compounds such as chromic oxide, chromic sulfate, chromic nitrate, chromic oxalate, and the like.

As in the case of the phosphate deposit, the alumina coated substrate having a deposit of a chromium-containing material is dried in air at a temperature approximately that of an exhaust system of an internal combustion engine for the purpose of conditioning the structure, and where required, the impregnation step and drying operation may be repeated to assure an adequate deposit of the chromium-containing material dependent upon the requirements of the engine and the type fuel employed in operating it.

Again, as has been disclosed above, an oxidation catalyst material is deposited or impregnated upon the alumina coated substrate, and, as disclosed in the above cited sole coassigned application of Robert J. Leak, vanadium oxide and copper oxide-copper chromate complexes are suitable oxidation catalysts for the treatment of the exhaust gases.

In accordance with an embodiment in which the substrate is a single, substantially continuous unit, the alumina film is formed over the surface of the entire substrate, and then a portion of the alumina film is impregnated with either the phosphorus or chromium-containing material and the remainder of the alumina film is impregnated with oxidation catalyst material. Alternatively, the substrate may be provided in separate sections, each bearing an alumina film. One section is impregnated with either the phosphorus- or chromium-containing material, and another section with oxidation catalyst material. As a further modification, a packed column or chamber may be employed with a portion of the packing having alumina formed thereon provided with either the phosphorus- or chromium-containing material and the remainder of the packing impregnated with the oxidation catalyst material. The structure is positioned or arranged in the exhaust system of the internal combustion engine such that the exhaust gases emitted therefrom first contact that part of the structure having either the phosphorus- or chromium-containing material deposited thereon. Reactive lead compounds in the exhaust gases are removed and retained in the phosphorus- or chromium-containing material section. In this manner, harmful lead compounds are removed from the exhaust gases, which are then passed into contact with the oxidation catalyst to oxidize the combustible compounds. If harmful lead compounds are not removed from the exhaust gases prior to contact with the oxidation catalyst, the oxidation catalyst may be poisoned. Thus, removal of the lead compounds from the exhaust gases by the phosphorus- or chromium-containing material extends the life of oxidation catalysts.

As has been disclosed in the second of the above-cited joint coassigned applications, the copper oxide-copper chromite complexes are useful as an oxidation catalyst alone or in combination with a vanadium oxide oxidation catalyst, in an automotive exhaust system, wherein the catalysts are arranged so that the exhaust gases, preferably following contact with the lead reactive chromium compound, as described above, are brought into contact with the vanadium oxide catalyst and thereafter, into contact with the copper oxide-copper chromite complex catalyst. Vanadium oxide is less susceptible to lead fouling or lead poisoning than the copper oxide-copper chromite complex, but the exhaust gases effluent from the vanadium oxide catalyst contacting step may have a disagreeable odor. The compounds responsible for the disagreeable odor may be converted to low odor compounds by passing the partly treated exhaust gases over the copper oxide-copper chromite catalyst. Other combinations of oxidation catalysts may be used, e.g. vanadium oxide and copper oxide-copper chromite complex catalysts may be deposited or formed on the same section of alumina-coated supporting substrate so that the exhaust gases simultaneously contact both vanadium oxide and the copper oxide-copper chromite complex catalysts.

Preferably one-half to three-fourths of the total catalyst supporting material or catalytic structure is impregnated with one or more of the oxidation catalysts described above and one-fourth to one-half is impregnated with a phosphorus- or chromium-containing material as described above to protect the oxidation catalyst from lead poisoning. Limits for the size of the exhaust system for optimum catalytic reaction require that the ratio of the sum of the volume of the catalytic muffler and the volume of the exhaust system leading thereto to the engine displacement range from 1.5 to 3.4.

Evaluation of a specific system described herein installed in a late model 394 cu. in. displacement automobile engine for a test stand 12,000 mile equivalent test showed the results set out in Table I below. The afterburner consisted of three 2 foot sections of the catalyst supporting material or substrate positioned in a 3¾ inch I.D. pipe so that the inner 1¼ inches was open.

The substrate was coated with alumina and copper oxide-copper chromite complex as the oxidation catalyst, as follows:

| Section No. | | 1 | 2 | 3 | Totals |
|---|---|---|---|---|---|
| 11 mil crimped Inconel | (g) | 839 | 971 | 836 | 2646 |
| -Alumina | (g) | 1187 | 1961 | 1061 | 4209 |
| Copper oxide-copper chromite | (g) | 190 | 297 | 232 | 719 |

Table I indicates the efficiency characteristics of such a catalytic afterburner during the 268 hour endurance run at 45 mph speed and load conditions.

Table I

| Hours | Hydrocarbon Emissions (PPM-$C_6$) | | % Reduction |
|---|---|---|---|
| | Before Catalyst | After Catalyst | |
| 1 | 333 | 68 | 80 |
| 22 | 350 | 160 | 55 |
| 90 | 2730 | 1130 | 58 |
| 96 | 1700 | 1230 | 28 |
| * | | | |
| 100 | 365 | 210 | 43 |
| 173 | 300 | 180 | 40 |
| 220 | 380 | 250 | 34 |
| 248 | 534 | 367 | 31 |
| 268 | 475 | 304 | 36 |

*Extremely high emissions required overhaul at 99 hours.

The acoustic type catalytic muffler is attractive commercially, since it would permit the manufacture of a limited number of types of catalyst supporting sections housed in a cylindrical casing or barrel for use in a wide variety of automobiles. Such casings could be installed and replaced easily and the salvage value recovered. Further, when the catalyst reacts with lead components, much of the lead burned in the fuel would be retained in the muffler, thereby reducing atmospheric lead pollution and ground surface contamination. With little or no attrition of the catalyst caused by vehicle vibration and exhaust gas pulsation, not only is the need for make-up catalyst eliminated, but further pollution of the atmosphere from either catalyst materials or lead compounds adhering to the catalyst surface is prevented.

The construction described for catalytic mufflers can be used in the manufacture of non-catalytic, through-flow acoustic mufflers. The annular mass of filamentary material, coated with alumina, would become bonded to its casing and so provide an acoustic medium for dampening unfavorable sound frequencies.

Thus, the rigid, porous, temperature resistant substrate would be long lasting, simple to use, and resistant to mechanical damage. No perforated center tube would be necessary as the alumina coated substrate itself forms the center of the muffler. Back pressure would not be increased materially as there would be little restriction to gas flow, so that more engine power should be realized. The mufflers could be used either as original equipment or provided as replacements for automotive mufflers.

The combination of air introduction closely adjacent and downstream the exhaust valves, an acoustic type catalytic muffler structure of relatively lower resistance to higher mass flow rates, and a back pressue regulating valve functioning at the lower speeds above idle to maintain a pressure higher than the normal back pressure of an exhaust system without the back pressure valve and remaining open at the higher speeds and mass flow rates at which the pressure of the exhaust system without the back pressure valve is above the pressure maintained at lower speeds all cooperate to provide a true combination which alone is capable of achieving the required reduction in hydrocarbon and CO emissions over long periods of service, while at the same time providing the rapid warm-up of the catalytic muffler on starting and yet preventing overheating of the catalyst above 1600°F. for any sustained period.

No warm-up period is required for operation of the disclosed automotive exhaust emissions control system as would be required for the critical operation of a catalytic reactor construction, since proper temperatures for reaction between the exhaust products and additional air are obtained either at the exhaust ports or in the exhaust system adjacent the catalytic muffler immediately upon starting of the internal combustion engine.

Thus, there has been shown and described, an apparatus by which the concentration of pollutant products in the exhaust emissions of an internal combustion engine is reduced in order to comply with current air pollution control requirements.

Other modifications and variations of the invention, as hereinbefore set forth, may be made without departing from the spirit and scope thereof, and therefore, only such limitations should be imposed as are indicated in the appended claims.

We claim:

1. In combination, an internal combustion engine having a cylinder, means for reducing the amount of pollutants including residual combustibles among the exhaust emissions from said cylinder comprising an exhaust system leading from an exhaust port of said cylinder, means for providing air in at least stoichiometric ratio adjacent and downstream of said exhaust port for combustion of said residual combustibles among said exhaust emissions in said exhaust system, means for controlling the back pressure in said exhaust system comprising valve means positioned therein downstream from said exhaust port functioning to restrict mass flow at the lower engine speeds above idle thereby to maintain a back pressure higher than the normal back pressure of said exhaust system without said valve means and opening at the higher speeds and mass flow rates when said normal back pressure without said valve means is above the imposed back pressure, and the improvement comprising an acoustic catalytic muffler construction located upstream and adjacent said valve means, said acoustic catalytic muffler construction comprising a casing having an inlet and an outlet and an annular mass of material within said casing, said mass of material supporting a catalyst compound for reducing the amount of pollutants among said exhaust emissions from said cylinder, said inlet of said catalytic muffler construction and said outlet thereof each having a diameter substantially equal to the inner diameter of said annular mass of material and all being located for throughflow of said exhaust emissions through said muffler construction, said annular mass of material being comprised of a plurality of fibrous sections having a general helical configuration, adjoining sections having contrasting helix angles.

2. In the combination as defined in claim 1, said catalytic muffler construction having a volume such that the ratio of the sums of the volumes of said muffler construction and the exhaust system leading up to said muffler construction to the engine displacement is in the range of from 1.5 to 3.4.

3. In the combination as defined in claim 1, said catalytic muffler construction being easily replaceable, said annular mass of material adjacent said inlet thereto being provided with a catalyst material to remove lead components from said exhaust emissions, and the remainder of said annular mass of material being provided with an oxidation catalyst material.

4. In the combination as defined in claim 1, said annular mass of material comprising a substrate with an adherent film of alumina and an oxidation catalyst deposited thereon, said oxidation catalyst being selected from metals from the group consisting of Group VIII and Period 4 of the Periodic Table of Elements.

5. In the combination according to claim 4, said oxidation catalyst comprising vanadium oxide.

6. In the combination according to claim 4, said oxidation catalyst comprising a copper oxide-copper chromite complex.

7. In the combination according to claim 4, said oxidation catalyst comprising vanadium oxide deposited on said film of alumina on one portion of said substrate and a copper oxide-copper chromite complex oxidation catalyst deposited on said film of alumina on another portion of said substrate.

8. In the combination as defined in claim 4, said annular mass of material including a compound capable of reacting with lead compounds and deposited ahead of said oxidation catalyst with respect to the flow of exhaust emissions through said muffler.

9. In the combination as defined in claim 8, said compound capable of reacting with lead compounds being selected from the group consisting of a phosphorus-containing compound and a chromium-containing compound.

* * * * *